United States Patent [19]

Sturman et al.

[11] Patent Number: 4,811,221

[45] Date of Patent: Mar. 7, 1989

[54] SIMPLIFIED BATTERY OPERATED AUTOMATIC AND MANUALLY OPERABLE VALVE

[75] Inventors: Eddie Sturman; Benjamin Grill, both of Northridge; Walter L. Harrison, Newhall, all of Calif.

[73] Assignee: Galcon, Kfar Blum, Israel

[21] Appl. No.: 924,208

[22] Filed: Oct. 28, 1986

[51] Int. Cl.$^4$ .................. G06F 15/46; G05D 7/06
[52] U.S. Cl. .................. 364/420; 364/510; 239/69; 251/30.01; 137/624.12; 137/624.13; 137/624.2
[58] Field of Search .................. 364/420, 509, 510; 137/624.11–624.22; 251/25, 29, 30.01; 239/68–70

[56] References Cited

U.S. PATENT DOCUMENTS

| | | | |
|---|---|---|---|
| 4,108,419 | 8/1978 | Sturman et al. | 364/420 |
| 4,114,647 | 9/1978 | Sturman et al. | 239/70 |
| 4,165,532 | 8/1979 | Kendall et al. | 239/70 |
| 4,176,395 | 11/1979 | Evelyn-Veere et al. | 239/69 |
| 4,178,963 | 12/1979 | Riefler et al. | 137/625.11 |
| 4,190,884 | 6/1980 | Medina | 239/63 |
| 4,272,019 | 6/1981 | Halaby | 239/70 |
| 4,310,021 | 1/1982 | Hauser | 137/624.2 |
| 4,360,877 | 11/1982 | Langston et al. | 364/465 |
| 4,423,484 | 12/1983 | Hamilton | 364/420 |
| 4,569,020 | 2/1986 | Snoddy | 137/624.2 |
| 4,592,505 | 6/1986 | Bruninga et al. | 137/624.18 |
| 4,633,905 | 1/1987 | Wang | 137/624.11 |
| 4,646,224 | 2/1987 | Ransburg et al. | 239/69 |

Primary Examiner—Jerry Smith
Assistant Examiner—Allen MacDonald
Attorney, Agent, or Firm—Blakely, Sokoloff, Taylor & Zafman

[57] ABSTRACT

Simplified battery operated automatic and manually operable valves for use in sprinkler systems and the like are disclosed. The valves are operable from a latching actuator controlled through a microcomputer programmed to turn the valve on and off at a specific time of the day. For purposes of programming the system once batteries are in place, the user simply pushes an on/off button at the desired turn on time of the day, at which time the valve will turn on. At the same time, the time of the turn on occurrence will be retained in memory. Similarly a subsequent operation of the same switch will turn off the valve and cause the storage in memory of the corresponding turn off time. Thereafter, the valve will automatically turn on and turn off at those programmed times on each subsequent day, or on such days as are commanded by control of a manually operated switch or as permanently wired. A mechanical override allows the turning on and turning off of a valve independent of the operation of the automatic control to allow operating the valves without disturbing the programming thereof, or of turning off the valve in the event of some failure after the valve is turned on. Alternate embodiments are disclosed.

38 Claims, 7 Drawing Sheets

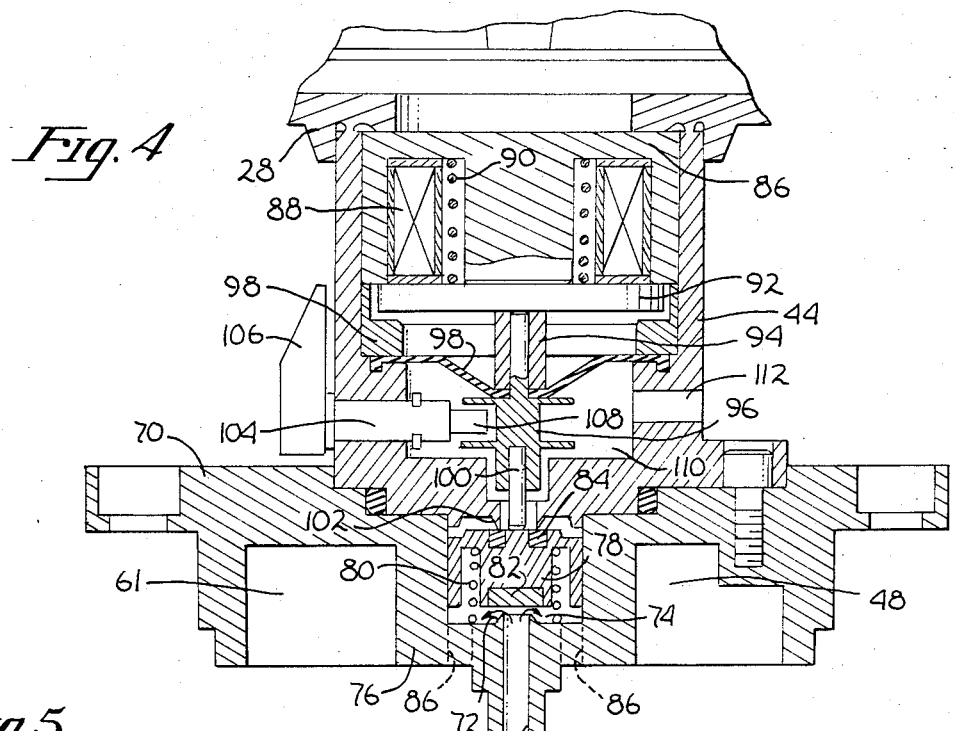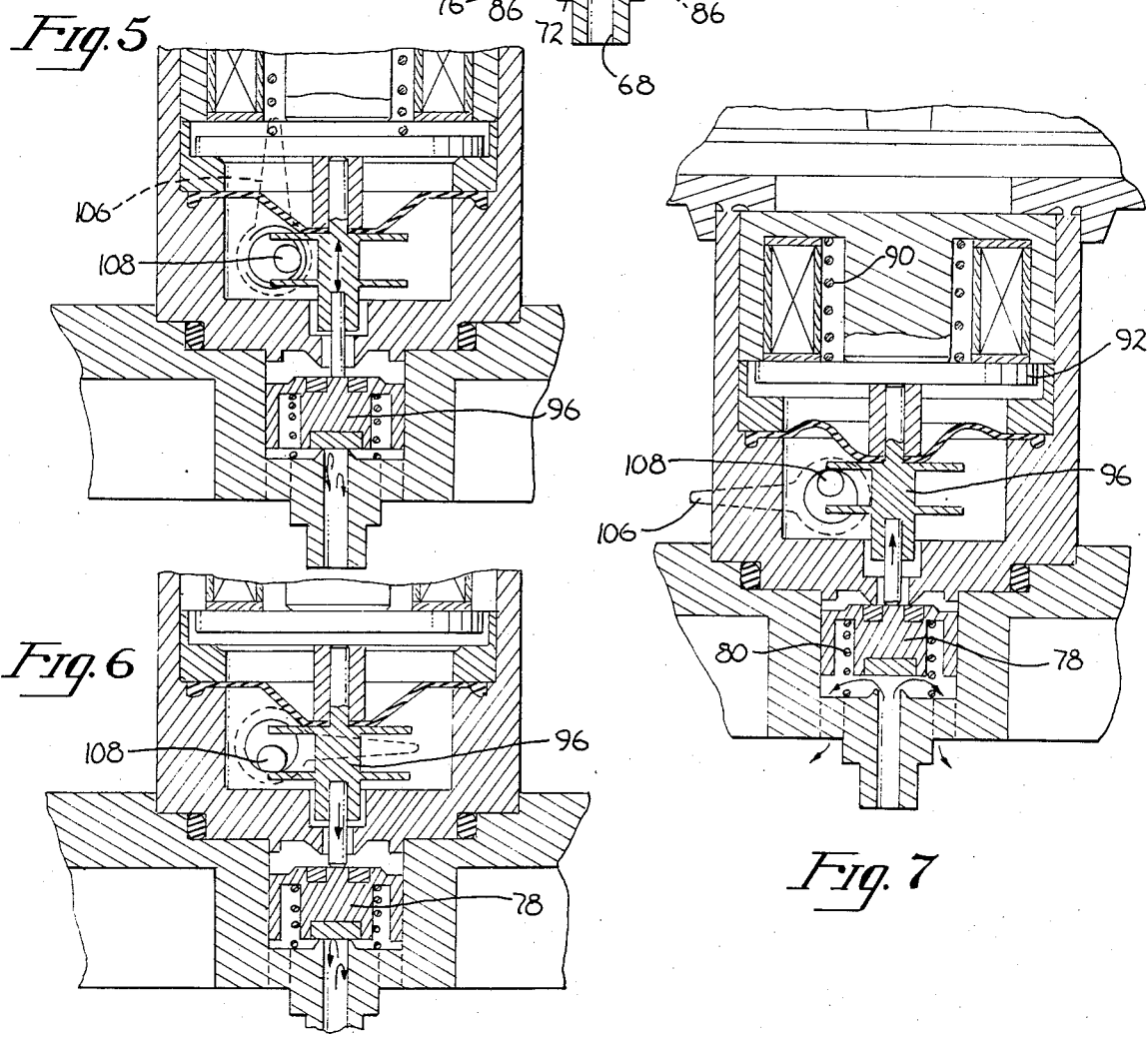

SIMPLIFIED BATTERY OPERATED AUTOMATIC AND MANUALLY OPERABLE VALVE

BACKGROUND OF THE INVENTION

1. Field of the Invention

The present invention relates to the field of automatic valves, and more particularly to the field of valves for use in automatic sprinkler systems.

2. Prior Art

Automatic sprinkler systems of various kinds are well known in the prior art, such as by way of example those disclosed in U.S. Pat. Nos. 3,821,967; 3,989,066; 4,107,546; 4,108 419; and 4,114,647. While these sprinkler systems operate in different ways, in general they have the capability of being set to turn on in selected intervals, to remain on for selected durations of time, and in various ways to control more than one valve. Other features such as moisture probes and the like are also known in these prior art systems. Such systems are highly versatile, giving a high degree of control to the user, which control may be changed from time to time at the convenience of the user to accommodate weather changes, seasonal changes, etc. Having a high degree of versatility and control however, can bring with it some degree of complication, both from a design and manufacturing standpoint, and from a user standpoint, with the result that the cost may be somewhat higher than necessary and at least the most unsophisticated users may become confused in attempting to set a system having a full range of choices of parameters for the user to control. This is particularly true for systems wherein settings are made to which the system does not respond to immediately, but rather will respond to at the prescribed times, whereby the user will not immediately get a sense of security that the system is properly set by the immediate response thereof. Further, each control or selection, such as time of day, on time, on/off override, etc., has heretofore generally been a separate manually operable switch, with each switch providing the opportunity for moisture entry and thus premature failure from that cause. Thus, among the objects of the present invention is to minimize the number and complexity of the controls required for the setting of the system, and to provide an immediate response to the user's programming commands so as to give even the most unsophisticated user a real sense of security that the programming has been accomplished properly Prior art systems also frequently include a way of controlling the turn on and turn off of a valve or overall system in a manner that will not interfere with a preprogrammed watering sequence. For instance, each controller of the fluid control system of U.S. Pat. Nos. 3,821,967 and 3,989,066 included an on switch as well as an off switch which could be used to trigger the respective valve on or off. Such controls are convenient to allow manually causing an extra operating cycle when desired, or alternatively cut short the usual operating cycle. However, since such controls utilize at least in part the batteries, the electronic control circuits, the latching actuator, etc., such controls are themselves dependent upon the proper operation of the entire system. As such, the controls cannot be used in the event of a dead battery to manually operate the system until the battery is replaced, or similarly, in the event the valve fails to automatically turn off due to some failure in the actuator or a relevant portion of the electronics, the same cannot be used as part of the manually operable turn off system to shut off the valve to prevent water damage, etc. It is thus one of the purposes of the present invention to provide a manual turn on and turn off capability which directly manually operates the pilot valve portion of the valve without dependence upon the proper operation of any of the electronics and/or the actuator. Finally, it is also an object of the present invention to seal the actuator region of the valve in a manner isolating the seal from any water filled region of the valve so that the actuator seal is not statically subjected to the high pressure in the valve, or subjected to the dynamic water hammer effect of the valve. Such an isolation avoids any actuator corrosion and premature failure due to an otherwise insignificant leakage of water from the valve assembly due to these static and dynamic effects.

BRIEF SUMMARY OF THE INVENTION

Simplified battery operated automatic and manually operable valves for use in sprinkler systems and the like are disclosed. The valves are operable from a latching actuator controlled through a microcomputer programmed to turn the valve on and off at a specific time of the day. For purposes of programming the system once batteries are in place, the user simply pushes an on/off button at the desired turn on time of the day, at which time the valve will turn on. At the same time, the time of the turn on occurrence will be retained in memory. Similarly a subsequent operation of the same switch will turn off the valve and cause the storage in memory of the corresponding turn off time. Thereafter, the valve will automatically turn on and turn off at those programmed times on each subsequent day, or on such days as are commanded by control of a manually operated switch or as permanently wired. A mechanical override allows the turning on and turning off of a valve independent of the operation of the automatic control to allow operating the valves without disturbing the programming thereof, or of turning off the valve in the event of some failure after the valve is turned on. Alternate embodiments are disclosed.

BRIEF DESCRIPTION OF THE DRAWINGS

FIG. 4 is a side view of a portion of the valve partially cut away.

FIGS. 5, 6 and 7 are partial cross sections illustrating the operation of the manual control.

DETAILED DESCRIPTION OF THE INVENTION

Figure 1:
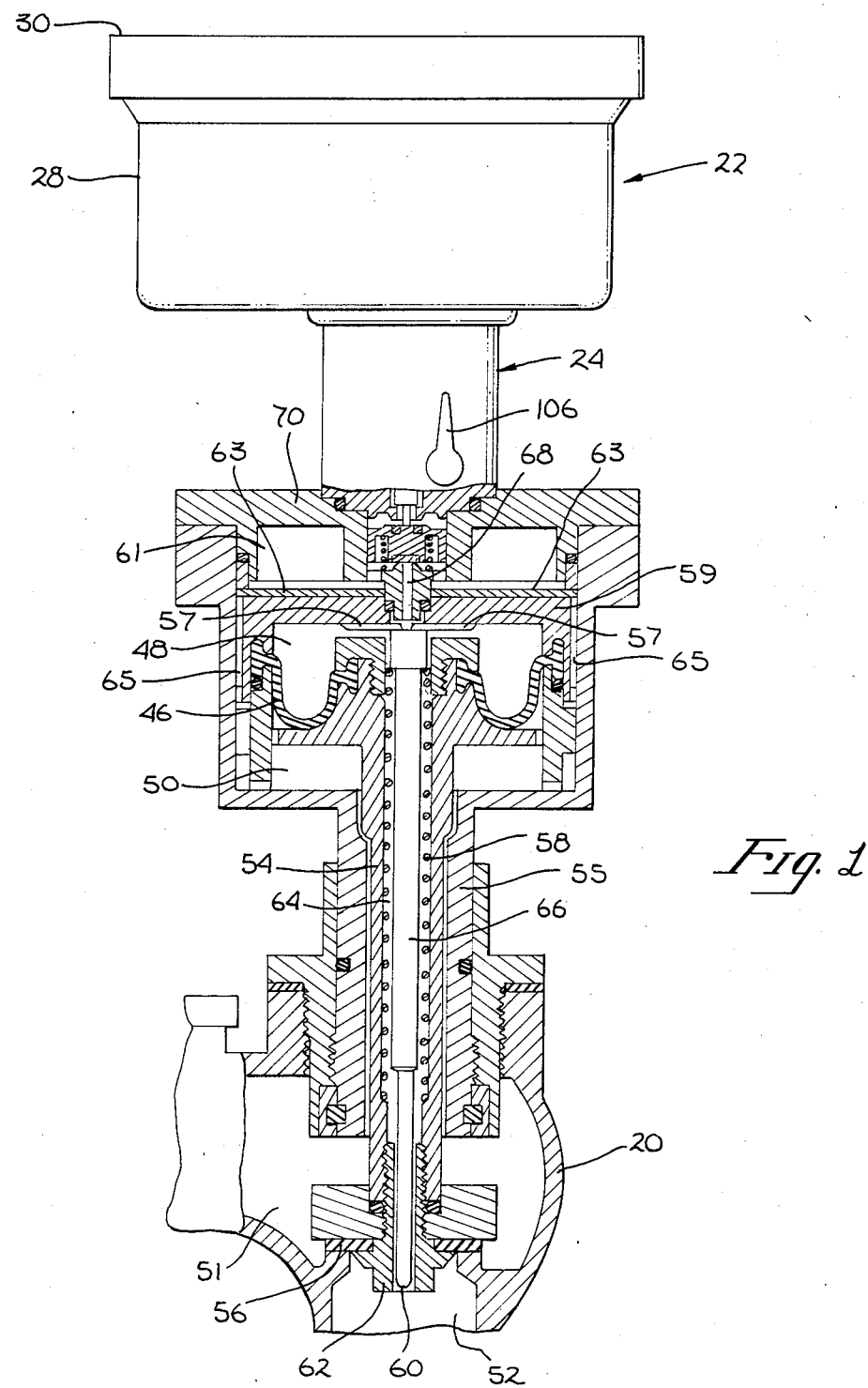
FIG. 1 is a side view, partially cut away, of the valve of the present invention.

First referring to FIG. 1, a side view, partially cut away, of the valve system of the present invention may be seen. The system, as shown mounted on a conventional antisiphon valve body 20, is comprised of three major subassemblies, specifically the power supply and electronic control module, generally indicated by the numeral 22, an actuator, overriding mechanical control and isolation assembly 24, and a pilot operated valve assembly 26.

Figure 2:
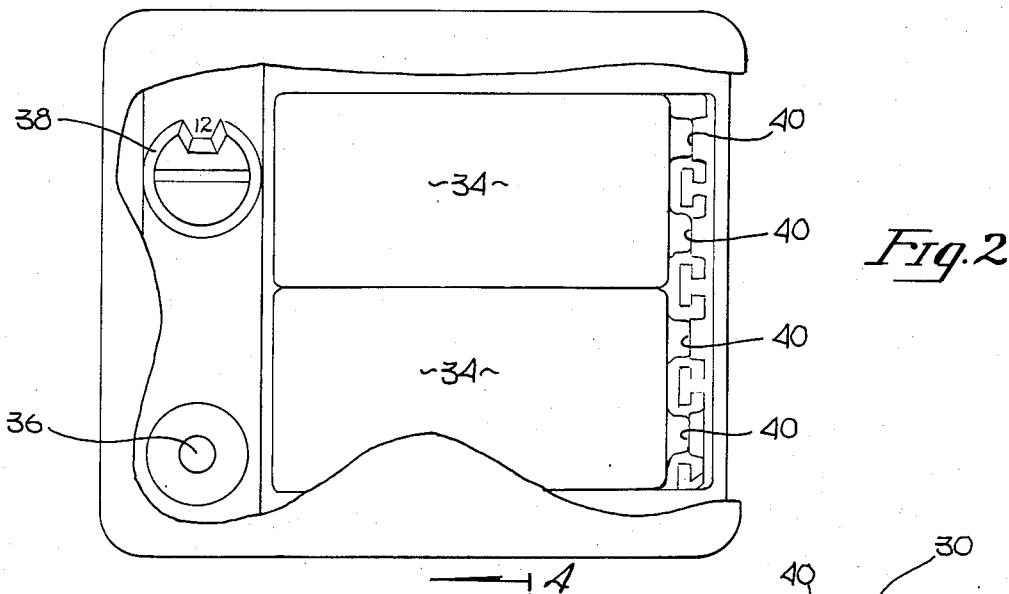
FIG. 2 is a top view of the valve of FIG. 1 with a portion of the top cover cut away to show the switches therebelow.
Figure 3:
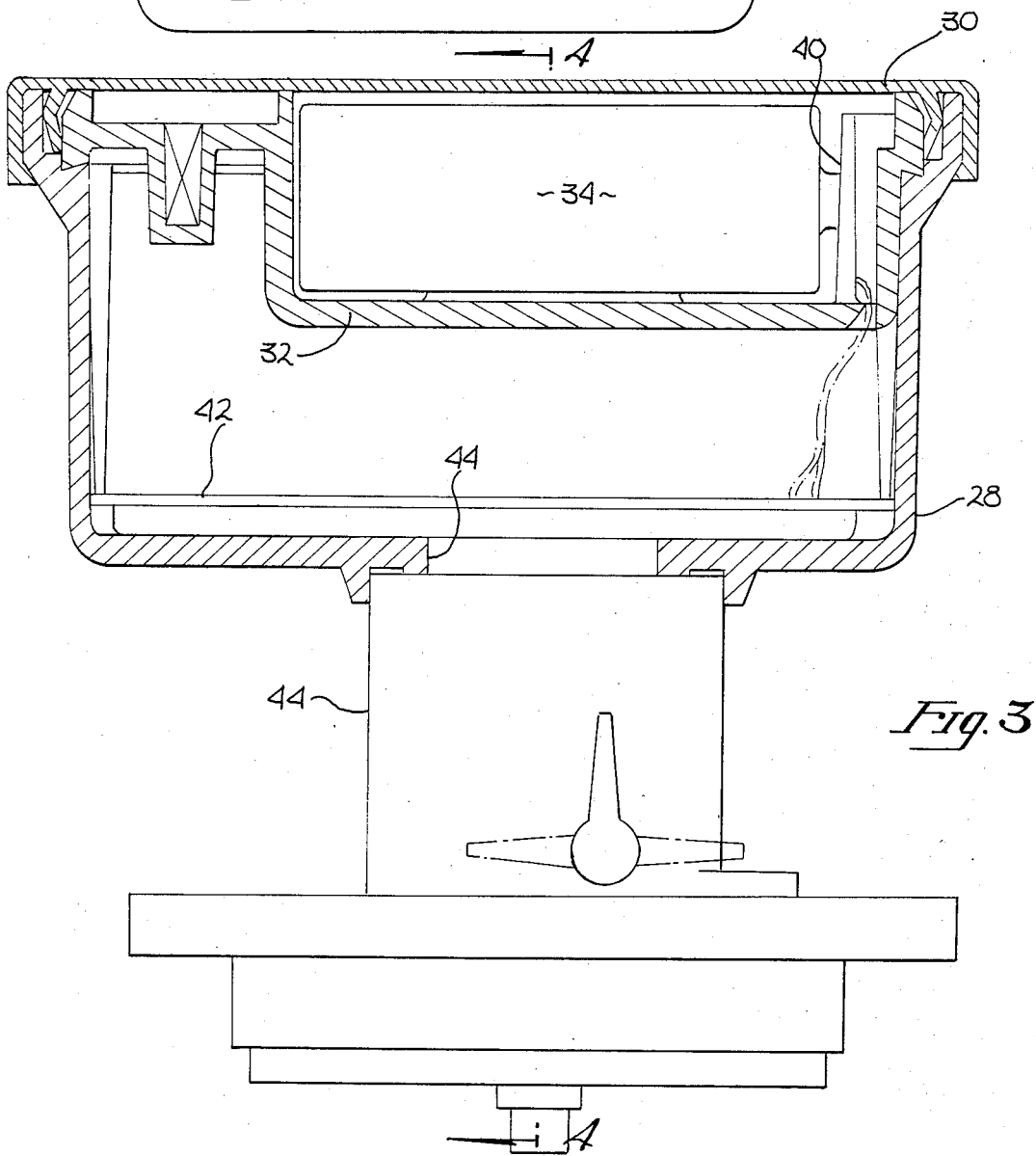
FIG. 3 is a side view taken on an expanded scale of a portion of the valve of FIG. 1, partially cut away.

The power supply and electronic control module in the embodiment illustrated may be seen in FIGS. 2 and 3. The module has a body member 28 with a removable cover 30 thereon. A second body member 32 is mounted therein and supports and provides contact for a pair of 9 volt transistor batteries for supplying power to the system. Also mounted under the cover are two controls, specifically a simple push button 36 and a rotary switch 38. Mounted below the inner body member 32 and electrically coupled to battery contacts 40 is a circuit on a printed circuit board 42, essentially sealed within the enclosure defined by the body 28 and the inner body member 32.

The lower portion of the body member 28 mates with and is sealed with respect to the body 44 of the actuator, overriding mechanical control and actuator assembly. The coupling of these two body members may be by way of screws or other removable attachment, though a more permanent attachment by way of ultrasonic or solvent welding is preferred.

The main operative portion of the pilot operated valve assembly 26 is similar to that shown and described in U.S. Pat. No. 4,107,546. In particular, a diaphragm 46 separates a chamber 48 above the diaphragm from a chamber 50 below the diaphragm, the chamber 50 being vented to the downstream side 51 of the valve body 20 in which the assembly is mounted by clearance between valve member 54 and valve body 55. When the pressure in the upper chamber 48 is equal to the inlet pressure in region 52 of valve body 20, the valve actuating member 54 is forced downward, forcing the valve closure member 56 against the seat on valve body 20 to close the valve, the effective area of diaphragm 46 being larger than the effective area of the valve seat. On the other hand, when the pressure 48 is substantially equal to the pressure in regions 50 and 51, valve member 54 will be forced upward by the pressure in the inlet region 52 against spring 58 to open the valve.

The manner in which the pressure in chamber 48 is controlled may be seen in FIG. 1, but is perhaps best illustrated with respect to FIG. 4, which is a cross section of portions of FIG. 1 taken on a larger scale. In particular, referring again to FIG. 1, water in the inlet region 52 of the valve may flow between pin 60 and valve closure member retainer 62 in the region 64 surrounding member 66. This member rests against four ribs 57 at the top thereof so that pressure in region 64 is communicated to region 48 and to passage 68 in the top plate 59 of the valve assembly. Passage 68 terminates at the top thereof at valve seat 72, with the chamber 74 thereabove being in communication with region 61 by the free passage of fluid through slots 63 in the top plate 59. This region in turn is vented to region 50 and thus the downstream region 51 through slots 65 at the sides of top plate 59 and the various parts therebelow (see FIG. 2). Above the valve seat 72 is a member 78 spring loaded toward an upper position by spring 80 and having valve closure members 82 and 84 at the bottom and top thereof respectively. The lower valve closure member 82 is cooperatively disposed with respect to valve seat 72 so as to engage and seal off passage 68 from region 61 when in the lower position, and to allow relatively unrestricted flow therebetween through ports 86 when in the upper position.

Mounted above member 78 is the body 44 of the overriding mechanical control and actuator assembly 24 (see FIG. 1). As shown in FIG. 4, at the top of body 44 and retained by body 28 of the power supply and electronic control module 22 is the stationary member 86 of the latching actuator. The stationary member 86 has a single coil 88 thereon with a coil spring 90 adjacent the coil 88 encouraging the moving actuator member 92 downward, the actuator member being shown in the upper or actuated and latched position. Below the moving member 92 is a tubular member 94 coupled to spool 96 in a manner to entrap the inner diameter of a diaphragm 98 therein, the diaphragm having its outer diameter sealed between body 44 and spacer member 98 therein to seal the actuator from the environment. Spool 96 in turn is coupled to a pin 100 which engages the top of member 78 through an opening in the body 44 having at the bottom thereof another valve seat 102. Finally, mounted to the side of body 44 is a pin 104 having an external control arm 106 and an internal eccentric pin 108 thereon extending between the sides of spool 96. The pin 108 is eccentric on pin 104, even though it is shown centered thereon in FIG. 4, as the position shown for the control arm 106 is the 90 degree or neutral position, allowing spool 108 to move up and down as commanded by the actuator to control the valve by way of the electronic control system.

In FIG. 4, the actuator is shown in the latched position which allows spring 80 to force member 78 upward so that the valve closure member 84 seals against the valve seat 102 to prevent any flow of water up around pin 100 and into the chamber 110 or out through opening 112. In this position however, valve closure member 82 is displaced from the valve seat 72 so that passage 68 and thus region 48 above diaphragm 46 is in effect in communication with region 61 and thus the downstream side 51 of the valve 20 (see FIG. 1). In this condition the pressures on the two sides of diaphragm 46 are substantially equal, the flow between pin 60 and valve closure member retainer 62 being much more restricted than the flow through the other ports, etc. of the pilot valve assembly. Thus the water pressure in the inlet region 52 of valve 20 will force the valve closure member 56 upward against the force of spring 58 to force the valve open and to allow the free flow of fluid from the high pressure region 52 to the lower pressure region 51 of the valve.

When the actuator is unlatched, the moving member 92 of the actuator will move downward under the force of spring 90, forcing member 94, spool 96, pin 100 and member 78 downward to close off the valve seat 72 by valve closure member 82, valve closure member 84 now moving away from seat 102 thereabove to allow any flow therethrough into region 110 to be freely discharged through opening 112. With flow through opening 68 being shut off by valve closure member 82, pressure from the inlet region 52 (See FIG. 1) will build up in region 48 above the diaphragm 46 to force the assembly downward as shown in FIG. 1 until valve closure member 56 closes the valve. Thus it may be seen that latched and unlatched states for the actuator determine the valve open and valve closed states respectively.

In the previous description it may be seen that when member 78 is in the lower position, water may flow through the clearance between pin 100 and valve seat 102 in the region 110 and out through opening 112. At this time however, there is no source of such water as the sprinkler valve, being used on an antisiphon valve 20, is positioned at a high point in the system so that the lower outlet pressure with the valve closed will tend to drain the pilot operated valve rather than to cause water to flow into this region. On the other hand, when the member 78 is in the upper position as shown, the opening through valve seat 102 around pin1100 is sealed so that the higher pressure water which is now available is not free to flow into region 110. Thus the only time any water may pass into region 110 and out through opening 112 is during the few milliseconds that member 78 is in transit from the lower position to the upper position. Accordingly, the amount of water lost through opening 112 is very low, being lost to evaporation under normal operating conditions. Note however, that the net effect of the arrangement shown is that diaphragm 98 which seals the actuator against the intrusion of moisture is not subjected on its other side to high pressure water or any water hammer effects, but instead is totally isolated therefrom by region 110 therebelow being vented to the atmosphere.

The operation of the overriding mechanical control is illustrated with respect to FIGS. 5, 6 and 7. FIG. 5 is a partial cross section similar to FIG. 4, though taken 90 degrees from the cross section of FIG. 4. As may be seen in FIG. 4, the pilot valve is illustrated in the open position corresponding to the valve open condition, with the manual control 106 being in the vertical or floating position. As is illustrated in FIG. 4, the eccentric 108 is not touching the spool, thereby allowing the valve member 78 to move to the upper position corresponding to the actuator latched condition or, as illustrated in FIG. 5, to the lower position corresponding to the pilot valve and thus the main valve closed condition. Accordingly, with the control arm 106 in the position illustrated in FIGS. 4 and 5, the pilot valve and thus the main valve is fully responsive to the state of the actuator, latched or unlatched.

In FIG. 6 (see also FIG. 3) the control arm is shown in the valve manually closed position wherein the eccentric 108 forces the spool 96 and thus the pilot valve member 78 downward to the pilot valve closed and thus the main valve closed position. Note that this is true irrespective of the condition of the actuator. In that regard, if the actuator were unlatched, the spool 96 would be in that position anyway, the manual control merely assuring that to be the case. As shown in FIG. 6 however, the actuator is latched and yet the manual control maintains the valve closed. In FIG. 7, on the other hand, the manual control 106 is shown in the valve open position forcing the spool 96 upward to allow the pilot valve closure member 96 to move to its upper position under the influence of spring 80. Thus even if the actuator is unlatched, which would normally command a valve closed condition, the manual control and eccentric 108 essentially moves the assembly upward against coil spring 90 so that the moving member 92 of the actuator is at or near the latched position. The actuator will not actually latch however, as the moving and stationary members have the magnetic state corresponding to the unlatched condition so that movement of the control 106 from the position shown in FIG. 8 to the floating position illustrated in FIG. 5 will result in the valve returning to the closed condition as the last electronically commanded position If, on the other hand, the actuator is actuated or latched as illustrated in FIG. 6 when the mechanical control is holding the valve off, moving the control to the floating position will again allow the valve to go to the last electronically commanded state, now the on condition.

Figure 8:
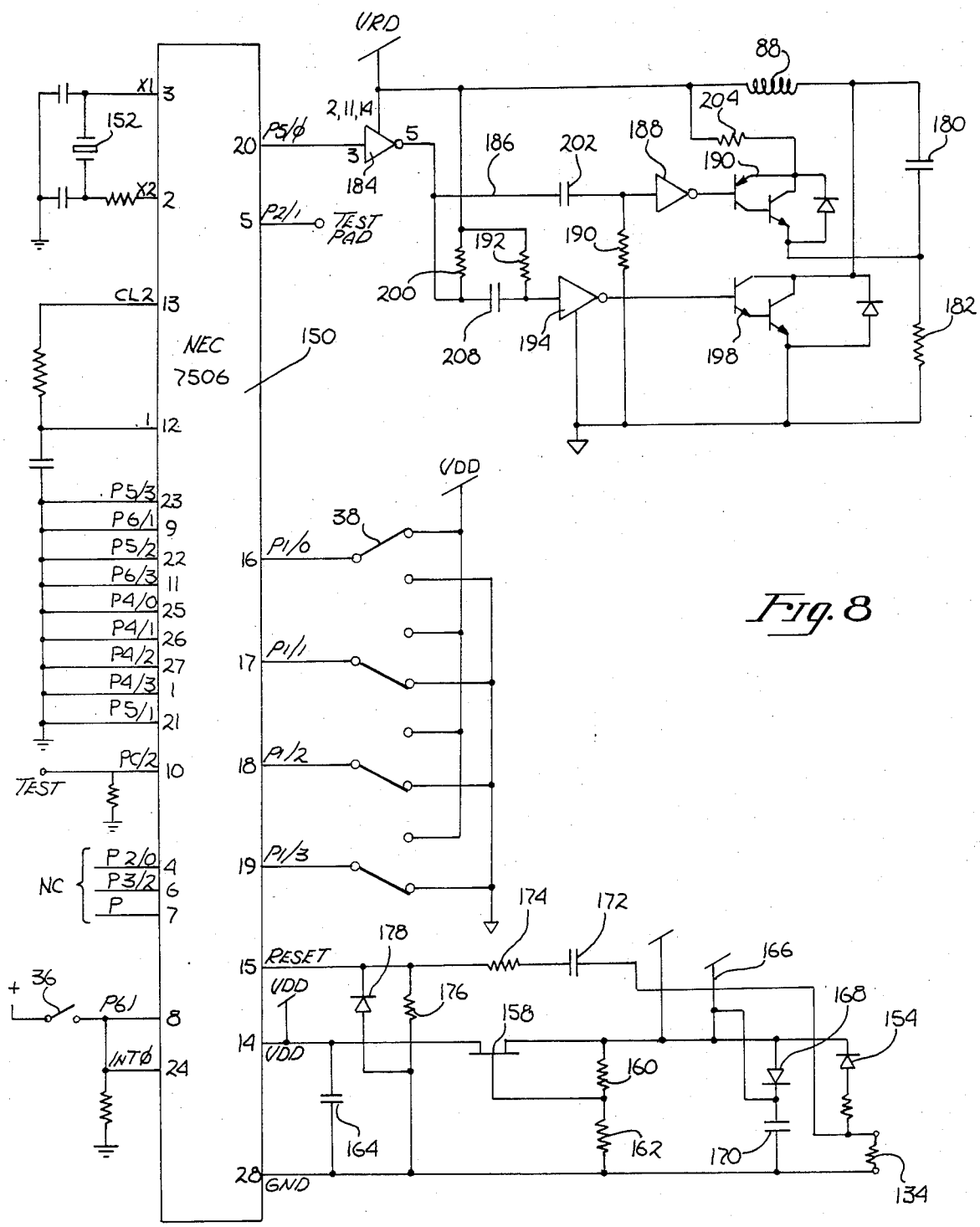
FIG. 8 is a circuit diagram for the microcomputer control circuitry of the valve.

Now referring to FIG. 8, a circuit diagram for the control circuitry for one embodiment of the present invention may be seen. The diagram shown is for a single station controller, that is a controller which will control a single valve on which it is mounted. As shown in the diagram, the circuit utilizes a single chip microcomputer 150 as the heart of the timing and control function. The specific single chip microcomputer for the embodiment shown is a 7506C CMOSS 4 bit single chip microcomputer manufactured by NEC. This device contains a 1,024×8 bit ROM typically used for program storage, and a 64×4 bit RAM typically used for temporary data storage. Another feature of this single chip microcomputer is that it also contains an 8 bit timer/event counter, used in the present invention to provide the programmable timing interval for the system in a manner subsequently described.

The microcomputer 150 has a clock input comprising a 32.768 KHz clock crystal 152 coupled in accordance with the microcomputer manufacturer's recommendations. Power for the microcomputer is provided by the two batteries 34 (see also FIG. 3), with reverse polarity protection and current limiting being provided by diode 154 and resistor 156 respectively. The power is regulated to the desired voltage by regulator 158 controlled through resistors 160 and 162, with noise on the line being limited by capacitor 164. In addition, the voltage VRD on line 166 is provided from the battery through the diode 168, with capacitor 170 providing substantial noise limiting for both supplies VDD and VRD as well as energy storage for the actuator turn on pulse. When the batteries are first connected, a pulse to the reset line is created through capacitor 172 and resistor 174, the pulse having a time constant determined by the capacitor 172 and resistors 174 and 176, diode 178 providing reverse polarity protection for the reset line.

The output for this embodiment is taken from pin 20, the first pin of output port 5. When the batteries are first installed (for simplicity, no separate power on/off switch is provided) the voltage VRD will go high, with capacitor 180 charging through the actuator coil 88 (see FIG. 4) and current limiting resistor 182. Normally the output of the microprocessor will be low. This will hold the output of inverter 184 on line 186 high. At the same time the input to inverter 188 will be held low by resistor 190 so that the output of the inverter will be high, holding transistor pair 190 off. At the same time the input to inverter 194 will be held high through resistor 192, resistor 200 acting as a pull up resistor for the output of inverter 184. The high input on inverter 194 provides a low output on line 196, holding transistor pair 198 off.

When the output of the microcomputer goes high signalling a valve turn on condition, the output of inverter 184 goes low, pulsing the input to inverter 188 further low through capacitor 202 so as to not affect the output of inverter 188. The input to inverter 194 however, initially being in the high state, will be pulsed low for a time duration determined by capacitor 208 and resistor 192. This pulses the output of inverter 194 on line 196 high, pulsing Darlington pair 198 on for the duration of the pulse. This essentially connects the actuator coil 88 (see also FIG. 4) directly across the voltage VRD. Since capacitor 170 is a relatively large storage capacitor, a relatively high current pulse will be provided through the actuator coil for a sufficient length of time to actuate the actuator so that the residual field can maintain the actuator in the actuated condition after the end of the current pulse. In general, the voltage across capacitor 170 will only drop something on the order of ten or fifteen percent during that current pulse so that the output of the regulator 158 is essentially unaffected by the turn on pulse.

When the output of the microcomputer again goes low, line 86 is pulsed high. Since the input to inverter 194 was already high, this merely pulses the input thereto further high, not affecting the output thereof. However, the input to inverter 188 is pulsed high with a time constant determined by capacitor 202 and resistor 190 pulsing the output thereof low to turn on transistors 190, for the duration of the pulse. This essentially connects the transistors, the current limiting resistor 204, the actuator coil 88, and capacitor 180 in a series loop, capacitor 180 discharging through the coil 188 with a current rate as limited by resistor 204 chosen in accordance with the other circuit parameters so that the current pulse through the actuator will effectively demagnetize the same and allow the moving member to go to the unactuated position before the current pulse is terminated. In that regard, note that this turn off current pulse through actuator coil 88 is in the opposite direction from the turn on pulse hereinbefore described. Thus the high output state of the microprocessor represents the valve on condition and the low output state represents the valve off condition. In that regard, if while the valve is on someone were to remove the batteries 34 from the controller, the voltage VDD would drop relatively rapidly because capacitor 164 is relatively small, and the microcomputer and resistors 160 and 162 would rapidly pull the voltage down, whereas capacitor 170, being a relatively large capacitor, would maintain the voltage VRD for a much longer duration. Thus the rapid drop in VDD with a much slower drop in VRD allows the loss of power to the microcomputer to pull the output thereof low, pulsing the actuator off while capacitor 180 still has more than an adequate charge to do so.

Finally, switch 36 (see also FIG. 2) will provide a switch closure signal as an input to the microcomputer, with the four leads on port 1 acting as an input port being coupled to switches 38 switchable between high and low states. The binary combination of these four switches provides 16 possible settings. One setting is normally used as the "off" setting, with the other 15 providing a choice of every day operation, every other day operation, etc., up to operation once every 15 days. Note that this off condition is not a power off but rather a "do not operate" condition. These switches 38 in the embodiment shown comprise a rotary switch, though a dip switch or even permanent strapping at the factory may be used as desired, depending upon the application.

Figure 9A:
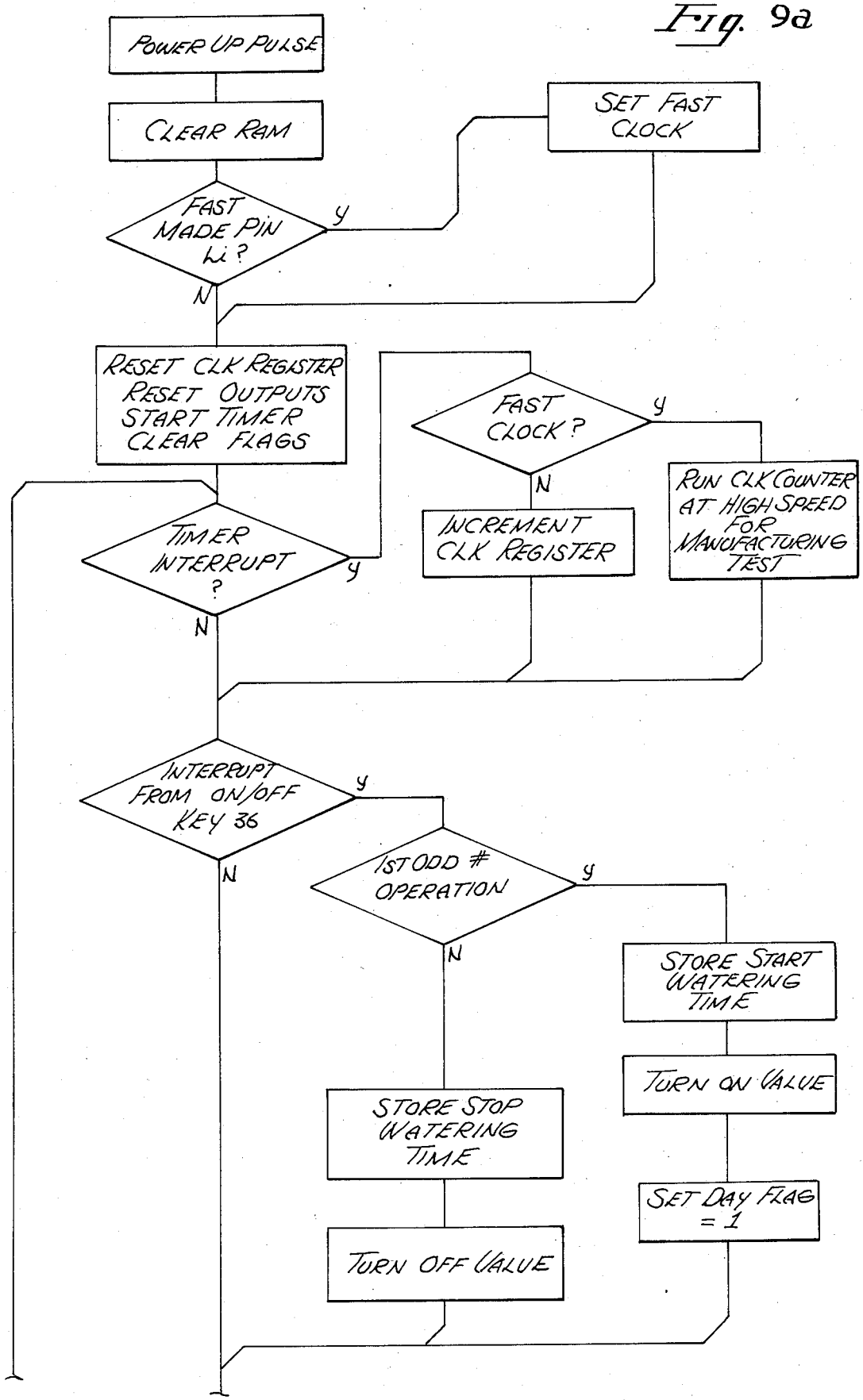
FIGS. 9a and 9b comprise a logic diagram for the microcomputer program.
Figure 9B:
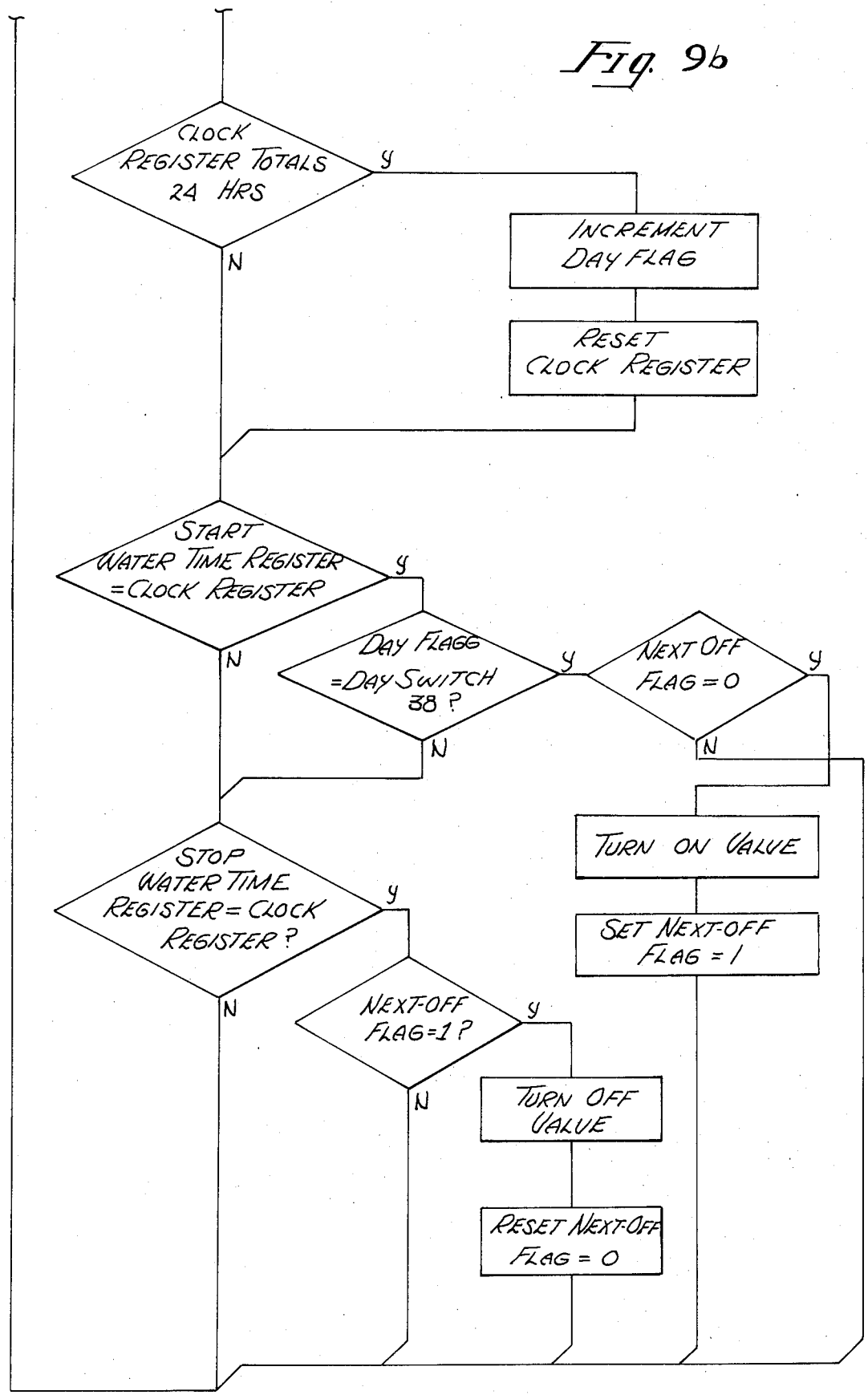

FIGS. 9a and 9b provide the logic flow diagram for the programming of the microcomputer. When the batteries are first installed a power up pulse on the reset line will be provided. This initiates a sequence which clears the RAM, after which the processor tests the "fast mode" pin, specifically the pin 10 of the microcomputer to determine whether that pin has been pulled high. The fast mode grossly comprises the time base of the system so that the typical 24 hour operation of the system may be compressed into a time scale of seconds at the factory for purposes of exercising and testing the entire system. If it has been set, the fast clock is set, which essentially causes the clocking through of the program at a rate orders of magnitude faster than the normal rate. In either event, the same program sequence is exercised as described below.

After setting or not setting the fast clock as the case may be, the clock register and the output latches are set, flags are cleared and the start timer is started. Then the timer interrupt is tested. In that regard, the 7506 microcomputer on chip timer periodically sets an interrupt, with the program then servicing the interrupt in a manner determined by the program. Thus periodically the timer interrupt will be set. If it is set when tested, the program will then determine whether the fast clock has been set. If not, the clock register is merely incremented once, though if it is set, the clock counter will be run at a high speed for compressing the time base for manufacturing testing as hereinbefore described. If the timer interrupt is not set, or alternatively, after the interrupt is serviced, the microcomputer will test for an interrupt (input) from the on/off key or switch 36 (see FIGS. 2 and 9). If the switch is depressed to provide the interrupt, the program then tests the flag to determine whether it is the first switch depression (a valve turn on signal) or a second switch depression for a turn off signal. If it is a turn on signal (Y) the present time is stored, the valve is turned on and the start day flag is set to 1. If, on the other hand, it is a turn off signal, the current time is stored as the stop watering time and the valve is turned off. After the interrupt, if any, has been serviced, the clock register is then tested to see if it totals 24 hours. If it does the day flag is incremented and the clock register is reset. In either event, the next test is to compare the start water time register with the clock register If the two agree, then the day flag is tested against the state of the day switch, which of course will always agree if watering is to occur every day, but otherwise may or may not agree as the case may be. If the day flag does agree with the state of the day switch, the next off flag is tested to determine whether the valve is currently off or on. If the flag is 0, indicating that the valve is currently off, the valve is turned on and the next off flag is then set to 1. If the valve is already on, indicating that the flag is already set, no action is taken. If either the start water time register does not equal the clock register or the day flag does not equal the day switch, the stop water time register is then compared with the clock register. If they are equal, the next off flag is tested, and if it indicates that the valve is currently on, the valve is turned off and the next off flag is reset. Note that with respect to the stop water time, the day flag need not be compared with the day switch as in the case of the start water time, as the next off flag will only indicate that the valve is on if the valve had been turned on by the earlier occurring positive comparison of the day flag and day switch.

From the lower end of the logic diagram of FIG. 9b, the program returns to again test the timer interrupt and to again precede through the sequence. In general the program is relatively short, so that the microcomputer will sequence through all the major tests in a very short time. On mostpasses, no change of conditions will be detected, with the most frequent change being the timer interrupt which essentially clocks off many very small fractions of a day. Otherwise the interrupt from the on/off key 36 will only occur during programming, with the clock register being reset only once a day and the valve turned and off only once a day or less.

Figure 10:
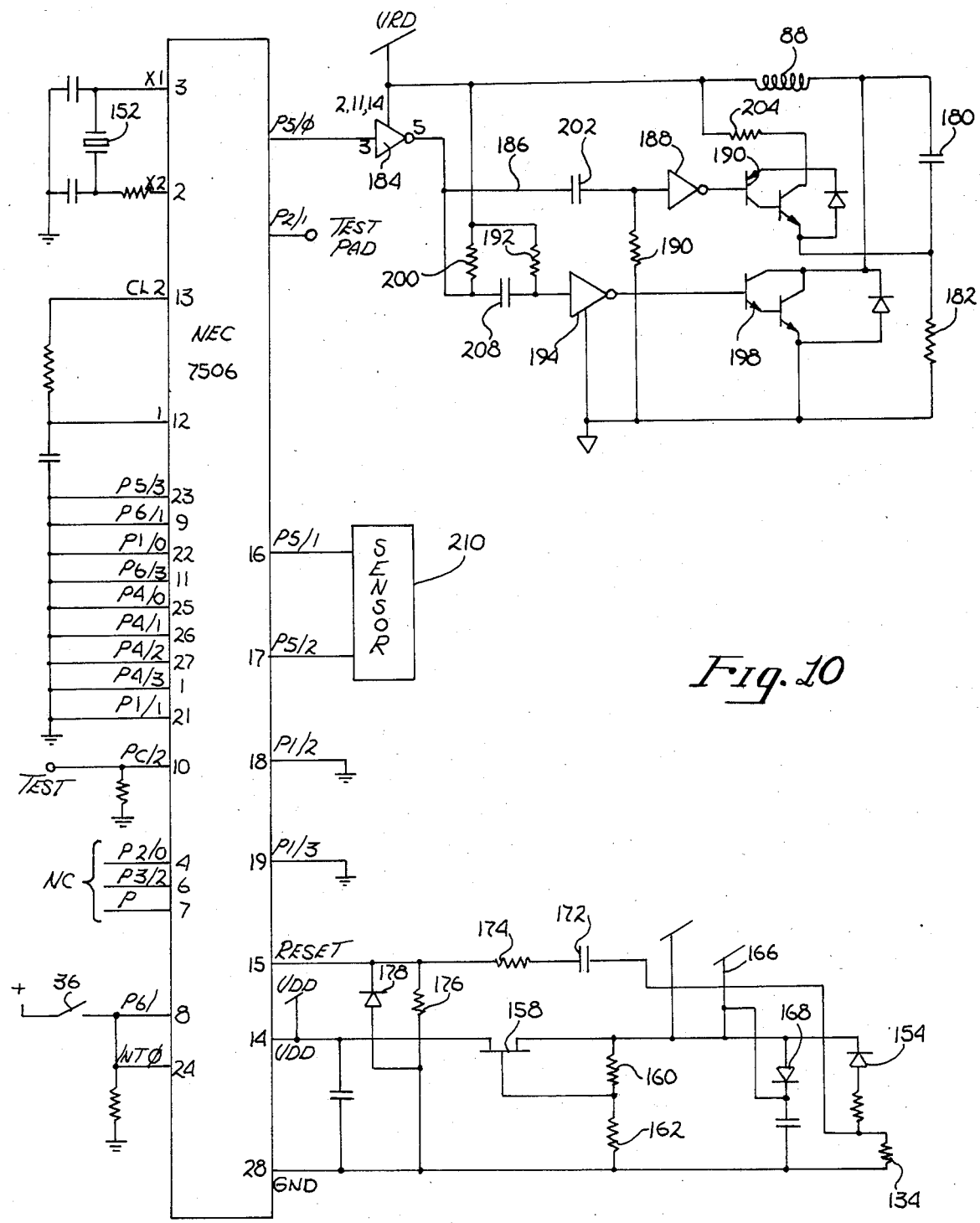
FIG. 10 is a circuit diagram for an alternate embodiment.

Now referring to FIG. 10, an alternate embodiment of the present invention may be seen. Much of this embodiment is the same as the embodiment described with respect to FIG. 8 and accordingly, circuit elements having the same number as the corresponding elements in FIG. 8 in general have the same function as was described with respect thereto. The single chip computer 150 of FIG. 8 however, has been identified in FIG. 10 as single chip computer 150a, as the same single chip computer may be used but as shall be subsequently described, the programming thereof is different in some respect so as to achieve substantially the same functions as hereinbefore described but in a manner responsive to different inputs. To be more specific, it will be noted in FIG. 10 that the switches 38 had been eliminated. The elimination of the switches 38 in this embodiment does not eliminate the function thereof but rather, the function thereof is combined with the normal function of switch 36 to reduce the number of switches required for programming of the system to a single switch, and more particularly, to a single pushbutton switch much more easily sealed to prevent water ingress than rotary or other switch types. Also, as a further alternative, a sensor 210 is coupled across two lines of an I/O port of the computer.

For programming the embodiment of FIG. 10, it will be recalled that the programming of the earlier embodiment was accomplished by pushing switch 36 once at the time of day the valve was to turn on and pushing the switch once more at the time of day the valve is to turn off, after which the valve would subsequently operate at those same times of day. This same programming sequence is used with the embodiment of FIG. 10. Either before or after that sequence is programmed, if switch 36 is turned on, the valve will respond by turning on as if to accept the switch depression as indicative of the time of day the valve is to operate. Holding the switch on for at least approximately five seconds however, signals to the computer that the time of day programming is not being programmed but rather, puts the controller in a skip set mode, indicated in this embodiment by the valve turning off after the five second on time even though the switch at least temporarily remains depressed. In essence, this provides a positive audible and visual feedback perceivable by the user that the unit has gone into the skip set mode. The user then releases the switch, followed by closing the switch a number of times equal to the number of days to be skipped.

By way of example, if two days are to be skipped before the next watering cycle, the switch button would be pushed twice, promptly being released after each switch closure. After approximately five seconds elapses from the last switch closure, the computer will time out and then cycle through a number of short on/off cycles (approximately three seconds each) equal to the number of days to be skipped to provide an audible and visual feedback as a check of the programming of the number of days to be skipped. By way of further example, if one later wanted to water every day, one would merely hold the switch closed for at least the five second interval during which time the valve would first immediately turn on and then after te five seconds turn off. With no subsequent switch closures the controller will again time out, this time accepting the lack of switch closures as an indication to not skip any days (e.g. skip zero days) as indicated by the fact that the valve will not go through any short cycles thereafter as hereinabove described. The net effect of course is that the cost of the switches 38 of FIG. 8 is eliminated and the integrity of the case seal is improved by the elimination of the more difficult to seal switches, and yet the same functions are preserved and the programming thereof readily apparent to a user.

As hereinbefore mentioned, also shown in FIG. 10 is a sensor 210, which sensor may take any of many forms. The purpose of the sensor is to provide a means for the valve to sense an external condition prior to turning on to verify that the conditions call for the operation of the valve. By way of example, one sensor may be a swimming pool level float sensor, such as a float switch or some other type of switch, the state of which may be tested by the single chip computer prior to turning on the valve to verify the need to do so. Another sensor might be a moisture sensor stuck in the ground to sense moisture therein to prevent the operation of the valve when a lawn, garden area, etc. already has adequate moisture such as in overcast weather, rainy days, etc. Various types of sensors may be used for this purpose, including sensors referred to as Irrometers and Tensiometers, though of course other moisture sensors may also be used, if desired.

There has been described herein a new and unique simplified battery operated automatic sprinkler valve ideally suited for use in consumer applications as well as various commercial applications. The valve system combines a relatively low cost through requiring a minimum of control, with simplicity and ease of operation by the valve performing the functions being programmed at the same time programming occurs, all of the foregoing in a structure which isolates the actuator (a normally moisture sensitive component), from the water containing portions of the valve and which provides a simple mechanical override for turning the valve on and off independent of the programming thereof and independent of any absence of power, electronic failure or failure of the actuator which possibly could have occurred. As mentioned before, the preferred embodiment disclosed and described herein provides a control for a single valve on which it is mounted, though a single controller could be used to control multiple valves by running of actuator control lines from the control module 22 to adjacent units, as in some of the prior art hereinbefore referred to. Such control lines may readily be provided by using additional output ports of the microcomputer to provide control for multiple valves. In such a case the programming would be substantially as described before. In that regard, the system could be programmed so that turning the first valve on followed by a subsequent turning of the valve off would result in the sequential operation of the multiple valves using the same watering duration as had been commanded for the first valve. Alternatively, the manual control could be used to step the entire system through its desired watering cycle using different watering durations for the various valves operated from the single controller, with the same cycle then automatically proceeding on the appropriate days. Similarly, since the microcomputer has a number of lines available as input ports, the system could be made responsive to external conditions such as, by way of example, to a moisture probe connected to the microcomputer, or from a remotely generated signal such as a signal from another controller, so that multiple controllers could be connected in series to operate in sequence, each controlling one or more valves. Accordingly, while the preferred embodiment of the present invention has been disclosed and described herein in detail, it will be understood by those skilled in the art that various changes in form and detail may be made therein without departing from the spirit and scope of the invention.

I claim:

1. For use as part of an automatic valve, the improvement comprising:
   a pilot operated valve assembly operatively between on and off positions for coupling to a valve body to provide a pilot operated valve operative between said on and off positions, said pilot operated valve assembly being responsive to a pilot valve therein;
   a latching actuator coupled to said pilot operated valve assembly for controlling said pilot valve therein for turning said pilot operated valve assembly on and off responsive to the state of said actuator; and
   a battery operated controller coupled to said latching actuator, said controller having a first manually operative switch means for turning said pilot operated valve assembly on and for subsequently turning said pilot operated valve assembly off, said controller also having automatic control measn responsive to the time of day said first manually operated switch means was used to turn said pilot operated valve assembly on and off for turning said pilot operated valve assembly on and off, respective at the same times of day on subsequent days.

2. The improvement of claim 1 wherein said control means is a digital means including memory means for retaining information responsive to the time of day said first manually operated switch is used to turn said pilot operated valve assembly on and off.

3. The improvement of claim 1 wherein said first switch means is a single switch.

4. The improvement of claim 1 wherein said first switch means is a single push button switch.

5. The improvement of claim 1 wherein said control means further includes manually operable means for determining the numbered of days to be skipped between each subsequent tunr on and turn off of said pilot operated valve assembly.

6. The improvement of claim 5 wherein said last named manually operable means is a switch means.

7. The improvement of claim 6 wherein said last named switch means is a second switch means.

8. The improvement of claim 1 further comprised of a sensor for sensing a condition indicative of the need for operation of said pilot operated valve assembly, said controller being coupled to said sensor and responsive thereto to control he operation of said pilot operated valve assembly.

9. The improvement of claim 8 wherein said sensor is a float switch.

10. The improvement of claim 8 wherein said sensor is a moisture probe.

11. The improvement of claim 1 further comprised of a valve body, said pilot operated valve assembly being coupled to said valve body to form an automatic valve.

12. For use as apart of an automatic valve, the improvement comprising:
    a pilot operated valve assembly operative between on and off positions for coupling to a valve body to provide a pilot operated valve operative between said on and off positions, said pilot operated valve assembly being responsive to a pilot valve therein;
    a latching actuator coupled to said pilot operated valve assembly for controlling said pilot valve therein for turning said pilot operated valve assembly on and off responsive to the state of said actuator;
    a battery power supply; and
    a digital controller having a microprocessor, a random access memory for temporary data storage and read only memory storing a predetermined operating program for said microprocessor, said digital controller being coupled to said latching actuator and said battery power supply, said digital controller having a first manually operative switch means coupled to said microprocessor for causing said microprocessor to turn said pilot operated valve assembly on responsive to the manual operation of said first manually operative switch means, and to turn said pilot operated valve assembly off responsive to a subsequent operation of said first manually operative switch means, said microprocessor also being responsive to the time of day said first manually operated switch means was used to turn said pilot operated valve assembly on and off to turn said pilot operated valve assembly on and off, respectively, at the same time of day on subsequent days.

13. The improvement of claim 12 wherein said microprocessor, said random access memory and said read only memory comprises a single chip computer.

14. The improvement of claim 13 wherein said first switch measn is a single switch.

15. The improvement of claim 13 wherein said first switch means is a single push button switch.

16. The improvement of claim 13 wherein said digital contorl means further includes manually operable means for determining the number of days to be skipped between each subsequent turn on and turn off of said pilot operated valve assembly.

17. The improvement of claim 16 wherein said last named manually operable means is a switch means coupled to said single chip computer.

18. The improvement of claim 17 wherein said last named switch means is a second switch means.

19. The improvement of claim 17 wherein said last named switch means is said first switch means.

20. The improvement of claim 13 further comprised of a sensor for sensing a condition indicative of the need for operation of said pilot operated valve assembly, said single chip computer being coupled to said sensor and responsive thereto to control the operation of said pilot operated valve assembly.

21. The improvement of claim 20 wherein said sensor is a float switch.

22. The improvement of claim 20 wherein said sensor is a moisture probe.

23. The improvement of claim 12 further comprised of a valve body, said pilot operated valve assembly being coupled to said valve body to form an automatic valve.

24. A method of operating an automatic valve comprising the steps of:
    (a) providing an automatic valve which will store information responsive to the time of day it is manually turned on and off;
    (b) manually turning the automatic valve on at a desired time of day;

(c) manually turning the automatic valve off a desired time after manually turning the valve on in step (b); and (d) allowing the automatic valve to turn on and off on subsequent days at the same times of day as in steps (b) and (c) based on the information stored in step (a).

25. The method of claim 24 wherein a single switch is used to turn on the valve in step (b) and to turn off the valve in step (c).

26. The method of claim 25 wherein said single switch is also used to program which subsequent days the valve is to operate.

27. The method of claim 26 wherein said single switch is used to program which subsequent days the valve is to operate by holding the switch in a predetermined state for at least a predetermined length of time and then operating the switch in a manner responsive to the number of days to be skipped before the next desired operation of the valve.

28. For use as part of an automatic valve, the improvement comprising
- a pilot operated valve assembly operative between on and off positions for coupling to a valve body to provide a pilot operated valve operative between said on and off positions, said pilot operated valve assembly being responsive to a pilot valve therein;
- a latching actuator coupled to said pilot operated valve assembly for controlling said pilot valve therein for turning said pilot operated valve assembly on and off responsive to the state of said actuator; and
- manually operable mechanical means disposed between said latching actuator and said pilot operated valve assembly for taking manual control of said pilot valve to turn said pilot operated valve assembly on and off independent of the state of said latching actuator and said controller.

29. The improvement of claim 28 wherein said manually operable mechanical means is vented to the atmosphere.

30. The improvement of claim 29 further comprised of a battery operated controller coupled to said latching actuator for automatically controlling said latching actuator.

31. The improvement of claim 28 further comprised of a valve body, said pilot operated valve assembly being coupled to said valve body to from an automatic valve.

32. For use as part of an automatic valve, the improvement comprising:
- a pilot operated valve assembly operative between on and off positions for coupling to a valve body to provide a pilot operated valve operative between said on and off positions, said pilot operated valve assembly being responsive to a pilot valve therein;
- a latching actuator coupled to said pilot operated valve assembly for controlling said pilot valve therein for turning said plot operated valve assembly on and off responsive to the state of said actuator; and
- a battery operated controller coupled to said latching actuator, said controller having a first manually operative switch means for turning said pilot operated valve assembly on and off, said controller also having control means responsive to said first manually operated switch means as used to turn said pilot operated valve assembly on and off for turning said pilot operated valve assembly on and off, respective at the same time of day on subsequent days, said control means further being responsive to said first manually operative switch means for determining the number of ays to be skipped between each subsequent turn on and turn off of said pilot operated valve assembly.

33. The improvement of claim 32 wherein said control means is responsive to a prolonged operation of said first switch means to accept subsequent operations of said switch means as an indication of the number of days to be skipped between successive operations of said pilot operated valve assembly.

34. For use as part of an automatic valve, the improvement comprising:
- a pilot operated valve assembly operative between on and off positions for coupling to a valve body to provide a pilot operated valve operative between said on and off positions, said pilot operated valve assembly being responsive to a pilot valve therein;
- a latching actuator coupled to said pilot operated valve assembly for controlling said pilot valve therein for turning said pilot operated valve assembly on and off responsive to the state of said actuator; and
- a battery operated controller coupled to said latching actuator, said controller having a first manually operative switch means for turning said pilot operated valve assembly on and off, said controller also having control means responsive to said first manually operated switch means as used to turn said pilot operated valve assembly on and off for turning said pilot operated valve assembly on and off, respective at the same time of day on subsequent days; and,
- manually operable mechanical means disposed between said latching actuator and said pilot operated valve assembly for taking manual control of said pilot valve to turn said pilot operated valve assembly on and off independent of the state of said latching actuator and said controller.

35. The improvement of claim 34 wherein said manually operable mechanical means is vented to the atmosphere.

36. For use as part of an automatic valve, the improvement comprising:
- a pilot operated valve assembly operative between on and off positions for coupling to a valve body to provide a pilot operated valve operative between said on and off positions, said pilot operated valve assembly being responsive to a pilot valve therein;
- a latching actuator coupled to said pilot operated valve assembly for controlling said pilot valve therein for turning said pilot operated valve assembly on and off responsive to the state of said actuator;
- a battery power supply; and
- a digital controller having in the form of a single chip computer, as microprocessor, a random access memory for temporary data storage and read only memory storing a predetermined operating program for said microprocessor, said digital controller being coupled to said latching actuator and said battery power supply, said digital controller having a first manually operative switch means coupled to said microprocessor for causing said microprocessor to turn said pilot operated valve assembly on, said microprocessor also being responsive to said first manually operated switch means as used to turn said pilot operated valve assembly on and off to turn said pilot operated valve assembly on and off, respectively, at the same time of day on subsequent days, and wherein said microprocessor is responsive to a prolonged operation of said first switch means to accept subsequent operations of said switch means to determine the number of days to be skipped between each subsequent turn on and turn off of said pilot operated valve assembly.

37. For use as part of an automatic valve, the improvement comprising:
    a pilot operated valve assembly operative between on and off positions for coupling to a valve body to provide a pilot operated valve operative between said on and off positions, said pilot operated valve assembly being responsive to a pilot valve therein;
    a latching actuator coupled to said pilot operated valve assembly for controlling said pilot valve therein for turning said pilot operated valve assembly on and off responsive to the state of said actuator;
    a battery power supply;
    a digital controller having in the form of a single chip computer, a microprocessor, a random access memory for temporary data storage and read only memory storing a predetermined operating program for said microprocessor, said digital controller being coupled to said latching actuator and said pattern power supply, said digital controller having a first manually operative switch means coupled to said microprocessor for causing said microprocessor to turn said pilot operated valve assembly on, said microprocessor also being responsive to said first manually operated switch means as used to turn said pilot operated valve assembly on and off to turn said pilot operated valve assembly on and off, respectively, at the same time of day on subsequent days; and,
    manually operable mechanical means disposed between said latching actuator and said pilot operated valve assembly for taking manual control of said pilot valve to turn said pilot operated valve assembly on and off independent of the state of said latching actuator and said controller.

38. The improvement of claim 37 wherein said manually operable mechanical means is vented to the atmosphere.

* * * * *